(12) United States Patent
Meeks et al.

(10) Patent No.: US 12,417,095 B2
(45) Date of Patent: Sep. 16, 2025

(54) SYSTEMS AND METHODS FOR BUILDING PRODUCTS

(71) Applicant: Change Healthcare Holdings, LLC, Nashville, TN (US)

(72) Inventors: Christopher Meeks, Austin, TX (US); Richard Andrew Starbuck, Walnut Creek, CA (US)

(73) Assignee: Change Healthcare Holdings, LLC, Nashville, TN (US)

( * ) Notice: Subject to any disclaimer, the term of this patent is extended or adjusted under 35 U.S.C. 154(b) by 213 days.

(21) Appl. No.: 17/482,730

(22) Filed: Sep. 23, 2021

(65) Prior Publication Data
US 2023/0092628 A1    Mar. 23, 2023

(51) Int. Cl.
G06F 8/77       (2018.01)
G06F 16/242     (2019.01)
G06F 16/248     (2019.01)
G06Q 10/101     (2023.01)

(52) U.S. Cl.
CPC ......... *G06F 8/77* (2013.01); *G06F 16/2428* (2019.01); *G06F 16/248* (2019.01); *G06Q 10/101* (2013.01)

(58) Field of Classification Search
CPC ...... G06F 8/77; G06F 16/2428; G06F 16/248; G06Q 10/101
See application file for complete search history.

(56) References Cited

U.S. PATENT DOCUMENTS

| | | | | |
|---|---|---|---|---|
| 6,029,195 A * | 2/2000 | Herz | ............... | H04N 21/25891 348/E7.071 |
| 6,718,365 B1 * | 4/2004 | Dutta | ................. | G06F 16/9538 707/999.005 |
| 7,283,997 B1 * | 10/2007 | Howard, Jr. | ........ | G06F 16/9535 707/999.005 |
| 7,360,170 B1 * | 4/2008 | Giormov | ................... | G06F 8/24 715/804 |
| 7,779,385 B2 * | 8/2010 | Hegde | ...................... | G06F 8/71 715/239 |
| 8,209,665 B2 * | 6/2012 | Rama | ....................... | G06F 8/75 717/121 |
| 9,086,943 B2 * | 7/2015 | Balasubramanian | ....................... | G06F 16/951 |
| 9,921,827 B1 * | 3/2018 | Evans | ................. | G06F 9/44536 |
| 10,095,734 B2 * | 10/2018 | Fontenot | ................... | G06F 8/77 |

(Continued)

*Primary Examiner* — Douglas M Slachta
(74) *Attorney, Agent, or Firm* — MARSHALL, GERSTEIN & BORUN LLP (57) ABSTRACT

A system for allowing product managers and software engineers to search for existing software modules that meet desired parameters and to identify opportunities to develop new software modules is provided. When product developer creates a software component they assign combinations of tags to the software component in a predetermined format and structure that describes features of the component such as the entity that would use the component, actions that are performed by the component, objects used by the component, and desired outcomes of the component. These tags are associated with the software component in the system. Later, when a developer has a need or idea for a particular component, the developer uses the system to construct a sentence that describes the features of the component as described above. The system then identifies any existing components that match or are close matches to the described component.

16 Claims, 7 Drawing Sheets

(56) References Cited

U.S. PATENT DOCUMENTS

| | | | |
|---|---|---|---|
| 10,191,734 B1* | 1/2019 | Totale | G06F 16/24522 |
| 10,241,988 B2* | 3/2019 | Burgmeier | G06F 16/24578 |
| 10,430,214 B2* | 10/2019 | Gupta | G06F 9/453 |
| 11,573,971 B1* | 2/2023 | Cannon | G06F 16/252 |
| 11,789,963 B2* | 10/2023 | Banerjee | G06F 16/955 |
| | | | 707/705 |
| 11,803,357 B1* | 10/2023 | Ozakdag | G06F 8/36 |
| 2003/0115370 A1* | 6/2003 | Jacquin | G06F 8/34 |
| | | | 719/310 |
| 2007/0050343 A1* | 3/2007 | Siddaramappa | G06F 16/80 |
| 2007/0061294 A1* | 3/2007 | Parnell | G06F 16/33 |
| | | | 707/E17.061 |
| 2007/0143376 A1* | 6/2007 | McIntosh | G06Q 10/109 |
| 2007/0185858 A1* | 8/2007 | Lu | G06F 16/951 |
| | | | 707/999.005 |
| 2007/0299825 A1* | 12/2007 | Rush | G06Q 10/10 |
| 2007/0299835 A1* | 12/2007 | Takeuchi | G06F 16/9024 |
| 2008/0082528 A1* | 4/2008 | Bonzi | G06F 16/9535 |
| | | | 707/999.005 |
| 2008/0215583 A1* | 9/2008 | Gunawardena | G06F 16/9535 |
| 2009/0249227 A1* | 10/2009 | Clark | G06F 3/011 |
| | | | 715/757 |
| 2009/0282403 A1* | 11/2009 | Poole | H04L 67/34 |
| | | | 717/178 |
| 2010/0318976 A1* | 12/2010 | Everly | H04L 67/535 |
| | | | 717/141 |
| 2011/0093489 A1* | 4/2011 | Gawor | G06F 16/353 |
| | | | 707/769 |
| 2013/0080997 A1* | 3/2013 | Dattathreya | G06F 8/71 |
| | | | 717/121 |
| 2014/0372455 A1* | 12/2014 | Locker | G06F 16/14 |
| | | | 707/750 |
| 2015/0074114 A1* | 3/2015 | Saito | G06Q 30/06 |
| | | | 707/740 |
| 2015/0147742 A1* | 5/2015 | Khalil | G06F 3/0482 |
| | | | 434/362 |
| 2016/0041825 A1* | 2/2016 | Chen | G06F 11/36 |
| | | | 717/162 |
| 2017/0017696 A1* | 1/2017 | Alonso | G06F 16/907 |
| 2017/0026240 A1* | 1/2017 | Purusothaman | G06F 3/0484 |
| 2018/0188900 A1* | 7/2018 | Gupta | G09G 5/32 |
| 2018/0239593 A1* | 8/2018 | Miyamoto | G06F 8/30 |
| 2019/0121807 A1* | 4/2019 | Boutros | G06F 16/9024 |
| 2020/0097261 A1* | 3/2020 | Smith | G06F 40/174 |
| 2020/0387504 A1* | 12/2020 | Holliday | G06F 3/0482 |
| 2022/0269735 A1* | 8/2022 | Balasubramanian | G06F 8/36 |
| 2022/0300524 A1* | 9/2022 | Banerjee | G06F 16/252 |

* cited by examiner

SYSTEMS AND METHODS FOR BUILDING PRODUCTS

BACKGROUND

When building products on a platform, product managers rarely have full insight into all the capabilities that exist within a company and how to leverage them. They may create new products that are duplicative or reinvent a feature that's already being used elsewhere. This is a problem as It creates a lot of waste in product development.

SUMMARY

A system for allowing product managers and software engineers to search for existing software modules that meet desired parameters and to identify opportunities to develop new software modules is provided. When product developer creates a software component they assign combinations of tags to the software component in a predetermined format and structure that describes features of the component such as the entity that would use the component, actions that are performed by the component, objects used by the component, and desired outcomes of the component. These tags are associated with the software component in the system. Later, when a developer has a need or idea for a particular component, the developer uses the system to construct a sentence that describes the features of the component as described above. The system then identifies any existing components that match or are close matches to the described component. If no components match the described component, the system may allow the developer to submit their desired component for approval or creation.

In an embodiment, a method is provided. The method includes: storing a plurality of components by a computing device; for each software component, assigning one or more more tags to the software component based on the functions performed by the software component by the computing device; providing a graphical user interface by the computing device; receiving a query constructed using the graphical user interface by the computing device, wherein the query defines a plurality of requirements of a desired software component; determining one or more stored software components of the stored software components whose assigned tags matches the query by the computing device; and presenting indications of the determined one or more stored software components in the graphical user interface.

Embodiments may include some or all of the following features. The query may be a natural language query. Receiving the query may include: receiving at least one entity; at least one object; at least one verb; and at least one outcome. The method may further include presenting each indication of a determined software components along with a rating of the software component and a number of products using the software component. The method may further include: presenting each indication of a determined software components along with an indication of the product that uses the software component. The method may further include: determining one or more stored software components of the stored software components whose assigned tags are partial matches of the query by the computing device; and presenting indications of the determined one or more stored software components whose assigned tags are partial matches of the query in the graphical user interface. The method may further include: determining that no stored software components of the stored software components match the query; and in response to the determination, presenting a request for approval to implement the desired software component.

In an embodiment, a method is provided. The method includes: providing a graphical user interface by a computing device; receiving a query constructed using the graphical user interface by the computing device, wherein the query defines a plurality of requirements of a desired software component; determining one or more stored software components of a plurality of software components whose one or more capabilities match the query by the computing device; and presenting indications of the determined one or more stored software components in the graphical user interface.

Embodiments may include some or all of the following features. The method may further include: storing the plurality of software modules by the computing device; for each software module, assigning one or more more tags to the stored software module based on the capabilities of the software module by the computing device. The query may be a natural language query. Receiving the query may include receiving: at least one entity; at least one object; at least one verb; and at least one object. The method may further include: presenting each indication of a determined software components along with a rating of the software component and a number of products using the software component. The method may further include: presenting each indications of a determined software component along with an indication of the product that uses the software component. The method may further include: determining one or more stored software components of the stored software components whose assigned tags are partial matches of the query by the computing device; and presenting indications of the determined one or more stored software components whose assigned tags are partial matches of the query in the graphical user interface. The method may further include: determining that no stored software components of the stored software components match the query; and in response to the determination, presenting a request for approval to implement the desired software component.

In an embodiment, a computer-readable medium is provided. The computer-readable medium includes computer executable instructions stored thereon that when executed by a computing device cause the computing device to: store a plurality of software components; for each software module, assign one or more tags to the software component based on the functions performed by the software component; providing a graphical user interface; receiving a query constructed using the graphical user interface, wherein the query defines a plurality of requirements of a desired software component; determining one or more stored software components of the stored software components whose assigned tags matches the query; and presenting indications of the determined one or more stored software components in the graphical user interface.

Embodiments may include some or all of the following features. The query may be a natural language query. Receiving the query may include receiving at least one entity; at least one object; at least one verb; and at least one object. The instructions may include instructions that present each indication of a determined software components along with a rating of the software component and a number of products using the software component. The instructions may include instructions that present each indications of a determined software component along with an indication of the product that uses the software component.

BRIEF DESCRIPTION OF THE DRAWINGS

The accompanying figures, which are incorporated herein and form part of the specification, illustrate systems and methods for updating and validating medical records. Together with the description, the figures further serve to explain the principles of the systems and method described herein and thereby enable a person skilled in the pertinent art to make and use the systems and methods for updating and validating medical records.

DETAILED DESCRIPTION

Figure 1:
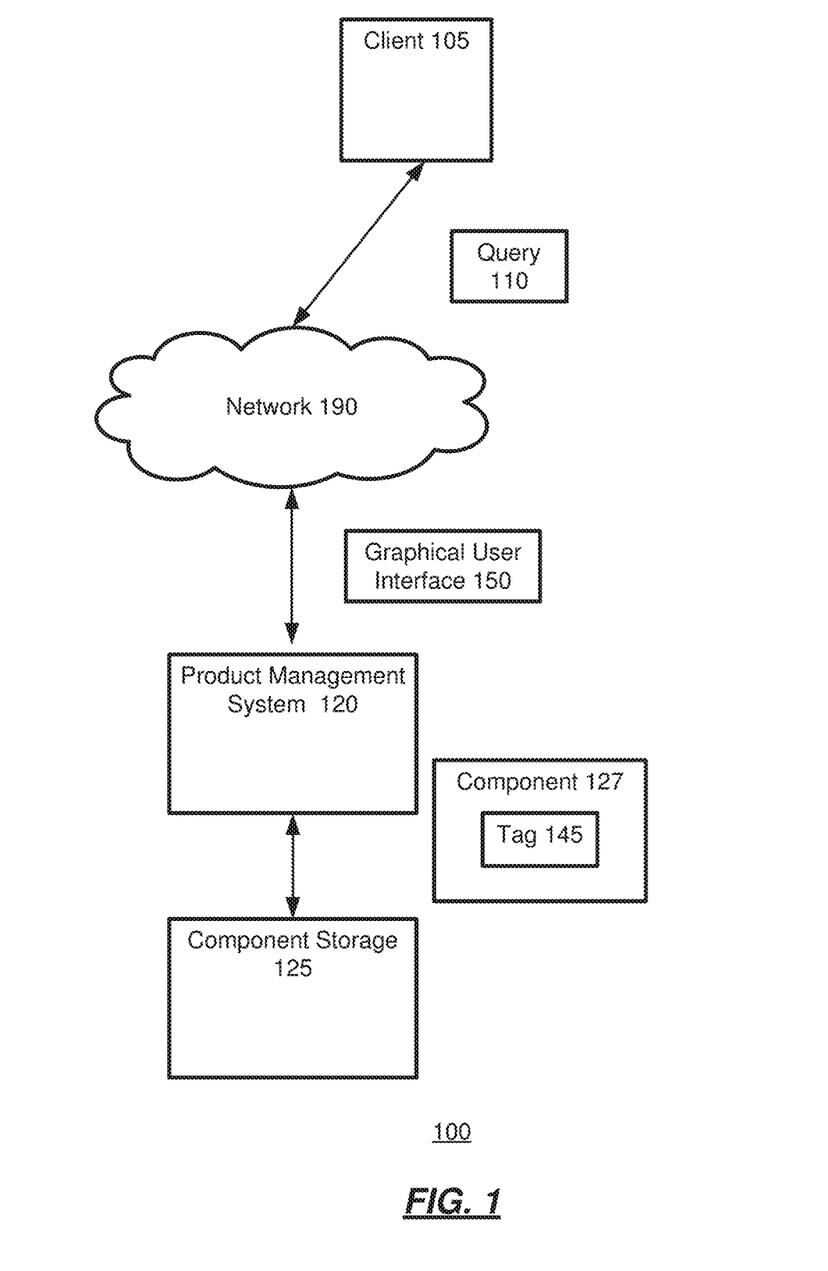
FIG. 1 is an example environment for managing one or more software components.

FIG. 1 is an example environment 100 for managing one or more software components. As used herein, a software component 127 may include software features and/or software modules. Generally, a software component may may include one or more software features. A software product may include one or more software modules, and a software suite may include one or more software products. Other types of software may be supported.

As shown, the environment 100 includes a product management system 120 in communication with one or more developers using a client 105 through a network 190. The network 190 may include a combination of public and private networks (e.g., the internet). The product management system 120 and the client 105 may each be implemented using one or more general purpose computing devices such as the computing system 700 illustrated with respect to FIG. 7.

The product management system 120 may store one or more software components 127 in the component storage 125. Each software component 127 may be stored along with one or more tags 145 that describe the various functions, operations, inputs, and outputs of the software component 127. Example tags 145 that may be associated with a software component 127 may describe the entity or entities (e.g., payor, payee, patient, and provider) that may use the software component 127, actions (e.g., nurture, verify, and understand) performed by the software component 127, objects (e.g., patient, provider, eligibility, and members) of the actions, and desired outcomes (e.g., improve our net promotor score, authorize appointments, authorize payments, and determine cost).

In some embodiments, when a developer creates a software component 127 using one or more tools provided by the product management system 120, the software developer may create the tags 145 and may store the tags 145 with the component 127 in the component storage 125. Alternatively, the product management system 120 may automatically generate the tags 145 based on the software component 127 or documentation associated with the software component 127.

The product management system 120 may execute one or more of the software components 127 stored in the component storage 125 for one or more entities. For example, the product management system 120 may execute the software components 127 associated with a suite of software products used by one or more entities. The entities may interact with the suite of software products using a graphical user interface 150 provided by the product management system 120.

In some embodiments, each software component 127 may be used by multiple modules, products, and/or suites. For example, with respect to a feature, the feature may be used by multiple software modules, which in turn may be part of multiple products or suites. Where a feature or module is used by multiple products or suites, only one instance of the particular feature or module may be executed by the product management system 120.

As described above, one current issue associated with software development may be duplication of work. One software developer working on a software product may want to create a component 127 that has a particular function or goal, but may not realize that another developer has already created such a software component 127 while working on a different software product.

Accordingly, to solve that problem and others, the product management system 120 may provide a graphical user interface 150 to developers (via one or more clients 105) that allows the developers to search for software components 127 using queries 110 that specify the particular criteria or requirements of a desired software component 127. Matching components 127 may be presented to the developer in the graphical user interface 150 along with information about each matching component such as documentation. The developer may then select a desired component 127, and may add the selected component 127 to an existing software module or software product that the developer is working on.

The query 155 may be a natural language query 110 and may use the same syntax or format as the tags 145 associated with the software components 127 stored in the component storage 125. The graphical user interface 150 may help the developer construct the query 155 by presenting one or more entities, objects, verbs, and outcomes for the developer to select from. The developer may then select from among the presented one or more entities, objects, verbs, and outcomes using the graphical user interface 150 to construct a sentence (i.e., the query 110) in a natural language syntax that captures the features and/or characteristics of the software component 127 that the developer is looking for.

The product management system 120 may then receive the query 110 through the graphical user interface 150 and may search the query 110 against the components 127 stored in the component storage 125. In one embodiment, the product management system 120 may search for components 127 whose tags 145 are responsive to the query 110. A software component 127 may be responsive to a query 110 when some or all of its associated tags 145 match an element (e.g., entity, verb, object, and outcome) of the query 110. The number of tags 145 required to match with the query 110 may be set by an administrator or may be set by the developer when submitting the query 110 using the graphical user interface 150.

The product management system 120 may present indications of the matching software components 127 to the developer in the graphical user interface 150. In some embodiments, each matching software component 127 may be presented with its title or name, and indications of the tags 145 that matched the query 110. Other information associated with the matching components 127 may be provided such as a rating or community score, and a list or number of other software suites, products, or modules that use each matching component 127.

The developer may select one of the matching software components 127 using the graphical user interface 150. The developer may then add the selected software component 127 to a software suite, product, or module under the control of the developer.

In the event that no software component 127 matches the query 110, the developer may submit a request for the software component 127 corresponding to the query 110 be approved. If the software component 127 is approved, the requesting developer, or another developer, may create the requested software component 127 and may store the requested software component 127 in the component storage 125. The software component 127 may be stored with one or more tags 145 that match the original query 110 so that the software component 127 may be discovered in the future by one or more other developers.

Figure 2:
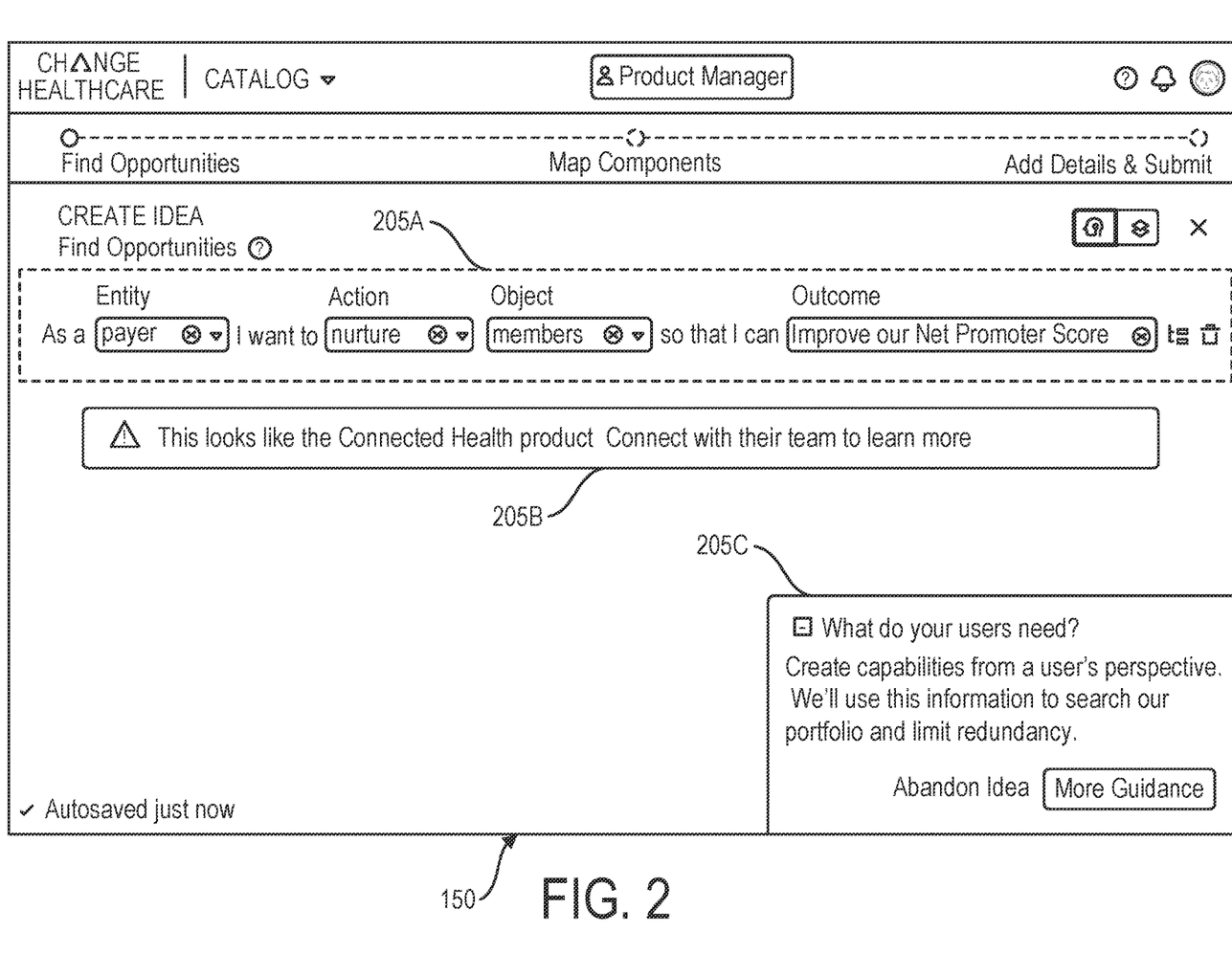
FIGS. 2-5 are illustrations of an example graphical user interfaces 150 that may be used by a developer to view one or more software components.

For example, FIG. 2 is an illustration of an example graphical user interface 150 that may be used by a developer to construct and submit a query 110. In an area 205A labeled "Find Opportunities" the developer has used a series of user interface elements to construct a query 110 that corresponds to a desired software component 127. In particular, the graphical user interface 150 includes a user interface element for each of the entity, action, object, and outcome elements. In the example shown, the developer has constructed the query 110 comprising the sentence "As a payer I want to nurture members so that I can improve our Net Promotor Score."

The product management system 120 received the query 110 through the graphical user interface 150 and determined a software product that includes one or more software components 127 that matched the query 110. As shown in a window 205B, a product called "Connected Health" matched the query 110, and the developer is invited to "connect with their team to lean more." Depending on the embodiment, the developer may be provided with contact information of the team or may be provided access to the various software components 127 of the product via the graphical user interface 150.

The graphical user interface 150 of FIG. 2 further includes a window 205C through which the user can receive additional guidance on how to create a software component 127 or can choose to abandon the creation process.

Figure 3:
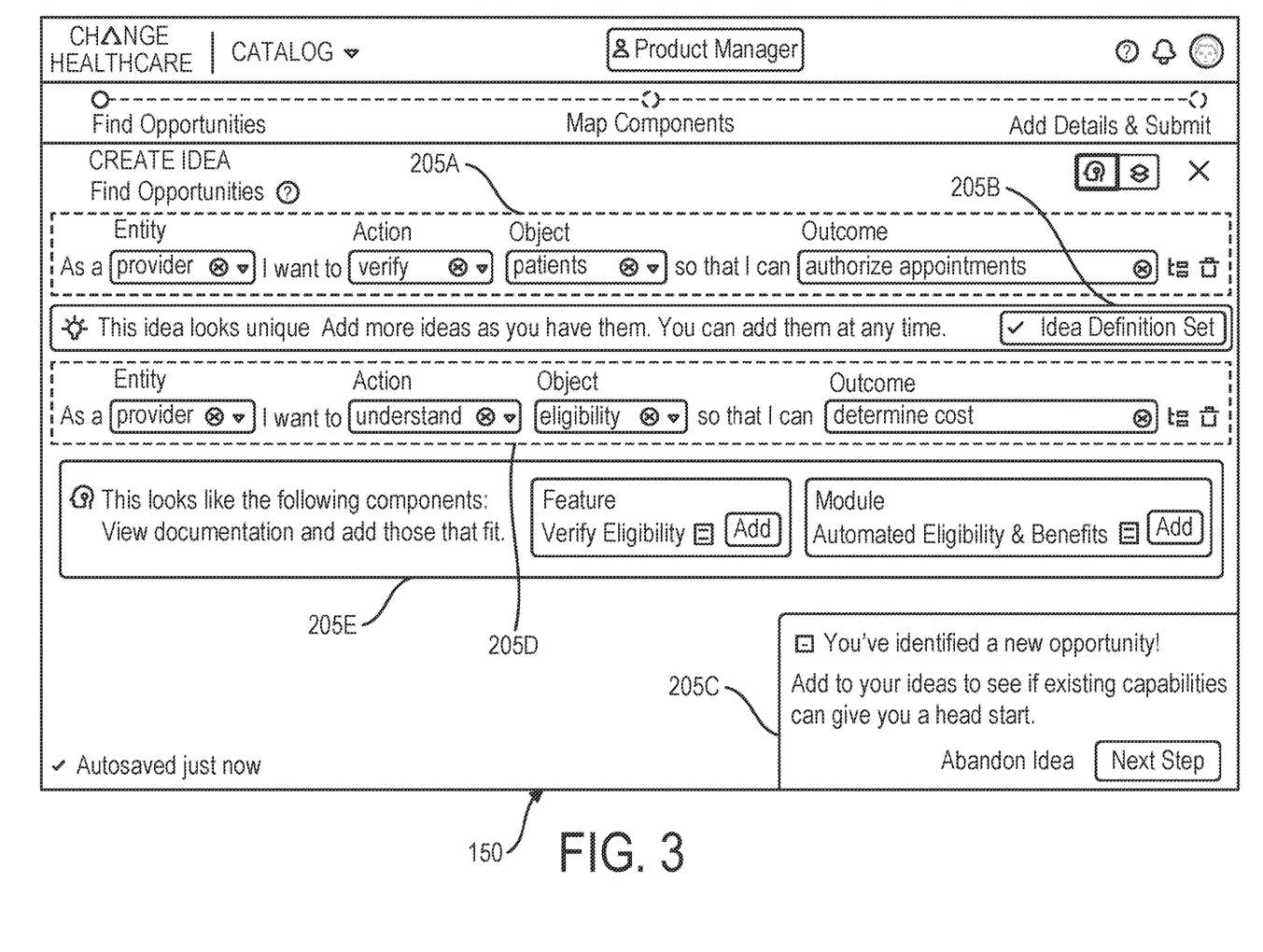

Continuing to FIG. 3 is another example graphical user interface 150. In the example shown, the provider has used the graphical user interface 150 to create and submit two queries 110 as shown in the areas 205A and 205D. In the area 205A the provider created and submitted the first query 110 that includes the sentence "As a provider I want to verify patients so that I can authorize appointments." In the area 205D the provider created and submitted the second query 110 that includes the sentence "As a provider I want to understand eligibility so that I can determine cost."

In response to the first query 110, the product management system 120 determined that no existing software components 127 matched the first query 110 and has caused a window 205B to be displayed in the graphical user interface 150. The window 205B invites the developer to submit the software component 127 corresponding to the query 110 for approval/creation by adding it to the idea definition set. In addition, the window 205C has been updated to reflect the new idea for a software component 127 corresponding to the first query 110.

In response to the second query 110, the product management system 120 determined that at least two software components 127 matched the second query 110 and caused a window 205E to be displayed in the graphical user interface 150. The window 205E indicates that two software components 127 matched the query 110 including a feature named "Verify Eligibility" and a module named "Automated Eligibility & Benefits." Each identified software component 127 is displayed in the window 205E with a user interface element allowing the developer to "Add" the software component 127 to a list of components 127 associated with the developer, and a user interface element allowing the developer to view documentation associated with each software component 127.

Figure 4:
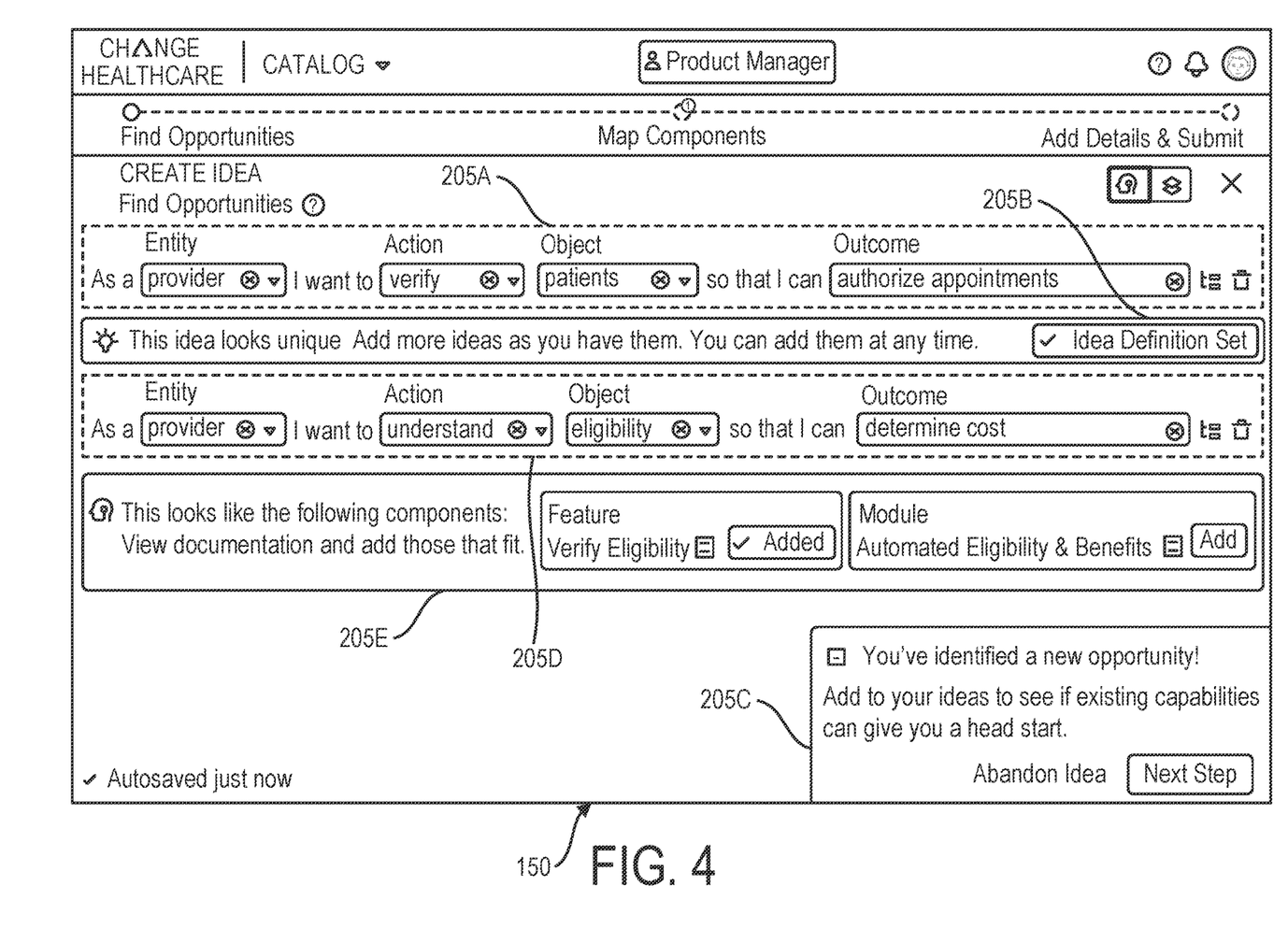

Continuing to FIG. 4, the developer has selected to add the feature "verify eligibility" to their list of associated components. As shown, a check has been added next to the feature in the window 205E to indicate the selection.

Figure 5:
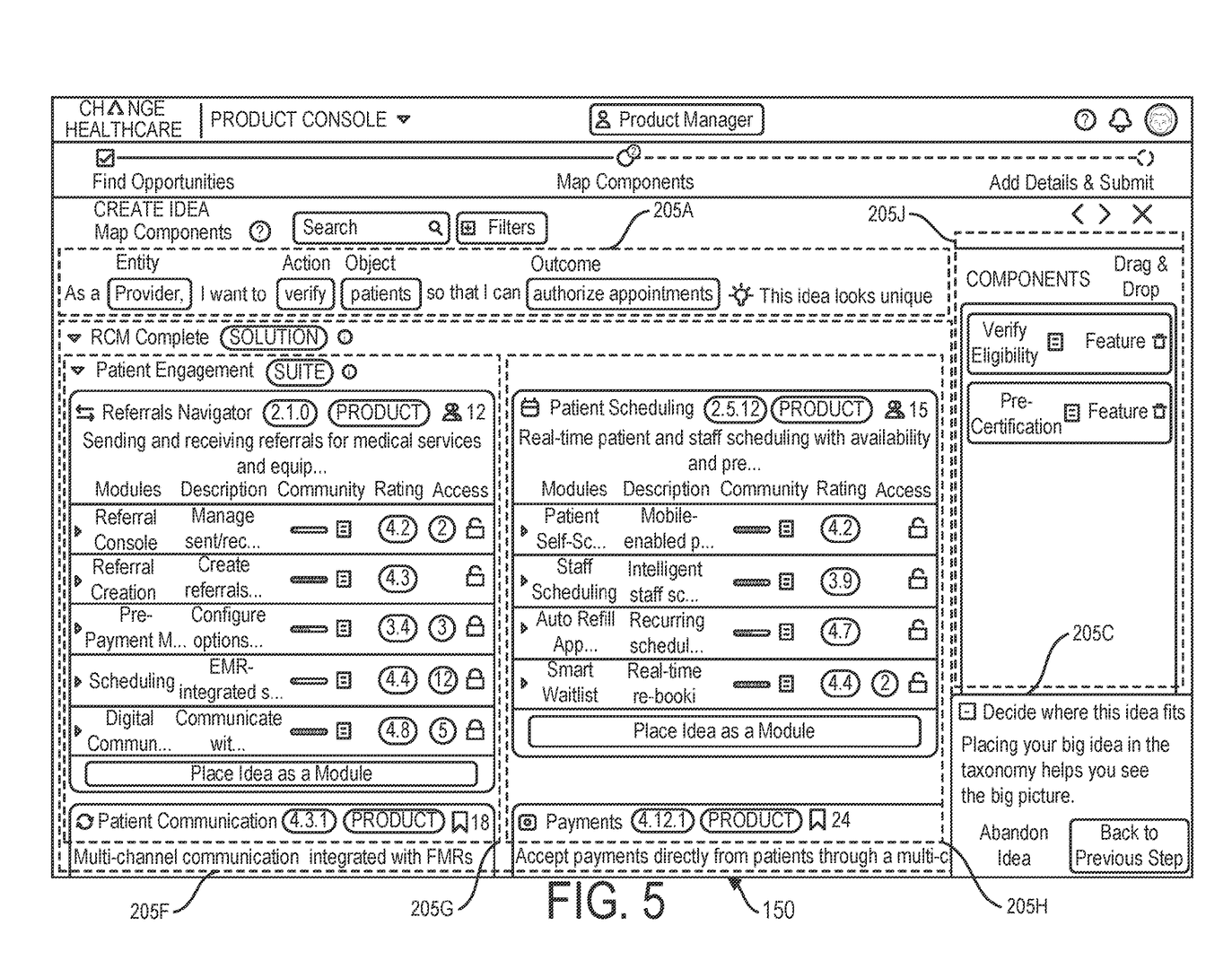

Continuing to FIG. 5, the developer is using the graphical user interface 150 to view one or more software solutions, suites, and products associated with the developer, and to place one or more selected software components 127. The selected software components 127 are displayed in the area 205J. As shown, the developer has selected software components 127 titled "Verify Eligibility" and "Pre-Certification."

In the area 205F, the developer has selected to view a software solution titled "RCM Complete" that includes at least one software suite titled "Patient Engagement." In the areas 205G and 205H, are displayed two different products associated with the "Patient Engagement" suite. In the area 205G is displayed a software product titled "Referrals Navigator." In the area 205H is displayed a software product called "Patient Scheduling."

Along with each of the software products is displayed some or all of the software components 127 (e.g., software modules) that make up each software product. As an example, in the area 205G is displayed several software modules including "Referral Console" and "Referral Creation." Also shown, adjacent to each software module is information about each software module including, but not limited to, a description, a rating given to the software module, and a number of other software products that use or access this software module.

As shown in the window 205C (e.g., "Decide where this idea fits") and in each of the areas 205G and 205H (e.g., Place Idea as a Module"), the developer may use the graphical user interface 150 to place the any of the software components 127 displayed in the area 205J into either of the software products shown in the areas 205G and 205H.

Figure 6:
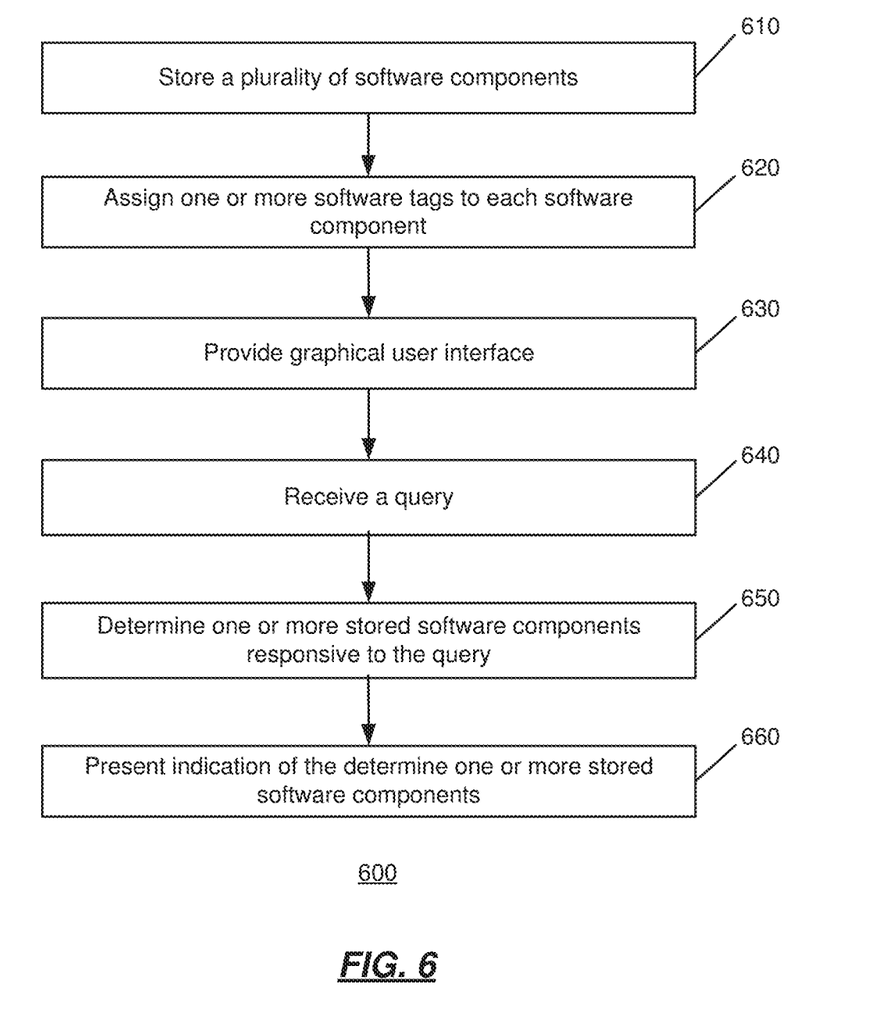
FIG. 6 is an illustration of an example method for executing operations in a transaction file.

FIG. 6 is an illustration of an example method for searching for software components that are responsive to a query. The method 600 may be implemented by the product management system 120.

At 610, a plurality of software components is stored. The plurality of software components 127 may be stored by the product management system 120 in the component storage 125. The plurality of software components 127 may include software features and modules and each may be part of one or more software products and software suites.

At 620, one or more tags are assigned to each software component. The tags 145 may be assigned to each software component 127 by a developer or programmer that created the component 145. Each tag 145 may be written in a particular syntax and may include descriptions of one or more entities, one or more verbs or actions, one or more objects, and one or more outcomes. Depending on the embodiment, each tag 145 may be written and assigned by the associated developer or automatically by the product management system 120. Alternatively, the product management system 120 may suggest tags 145 to the developer and the developer may select the tags 145 that they would like to associate with the component 127.

At 630, a graphical user interface is provided. The graphical user interface 150 may be provided by the product management system 120 to a client 105 associated with a developer through the network 190. The developer may use the graphical user interface 150 to construct a sentence that captures the idea or goal of a software component 127 that they would like to include in a product or module that they are working on. The developer may express the idea for the desired software component 127 by selecting one or more entities, verbs, action, and outcomes for the software component 127 to form a natural language sentence.

At 640, a query is received. The query 110 may be received by the product management system 120 through the network 190 from the graphical user interface 150. The query 110 may be constructed from the sentence provided by the developer through the graphical user interface 150.

At 650, one or more software components responsive to the query are determined. The one or more software component 127 that are responsive to the query 110 may be determined by the product management system 120 searching the query 110 against the tags 145 associated with each software component 127 stored in the component storage 125. Depending on the embodiment, a software component 127 may be responsive to the query 110 when all of the tags 145 associated with the software component 127 match a feature or term of the query 110. Alternatively, a software component 127 may be responsive to the query 110 when some percentage or threshold number of tags 145 associated with the software component 127 match the query 110.

At 660, indications of the determined one or more stored software components are provided. The indications of the determined one or more stored software components 127 are provided by the product management system 120 to the developer. The indications may be displayed to the developer in the graphical user interface 150. The developer may then view information associated with each software component 127 and may select one or more of the software component 127 to add to their software project or software module.

Depending on the embodiment, in the event that no software component 127 that matches the query 110 is determined, the developer may be encouraged by the product management system 120 to submit the idea corresponding to the desired software component 127 and/or query 110 for approval and possible implementation on the product management system 120.

Figure 7:
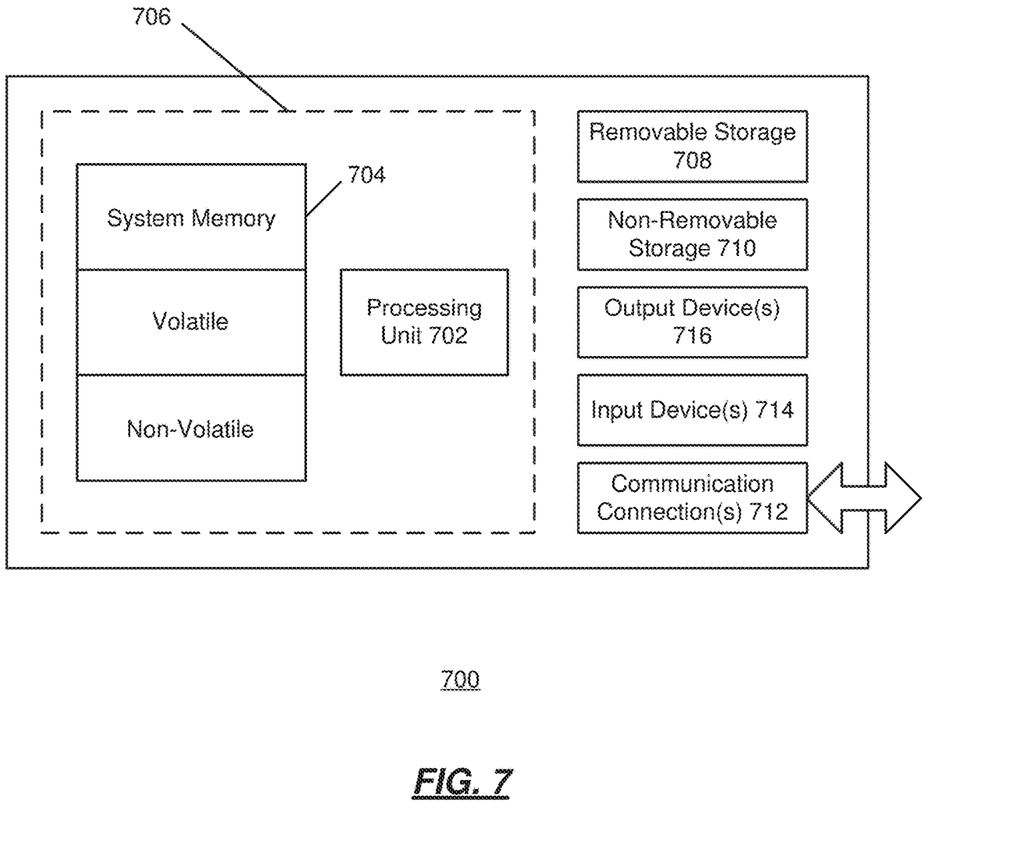
FIG. 7 shows an exemplary computing environment in which example embodiments and aspects may be implemented.

FIG. 7 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by the device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communication connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for aiding development of a software product, the computer-implemented method comprising:
   storing, by one or more processors, a plurality of executable software components;
   for each software component of the plurality of executable software components, assigning, by the one or more processors, one or more tags to the software component based on one or more functions performed by the software component when executed;
   providing, by the one or more processors, a graphical user interface;
   receiving, by the one or more processors and through the graphical user interface, a query constructed using the graphical user interface, wherein the query defines one or more requirements of a desired software component;
   determining, by the one or more processors, whether one or more stored software components of the stored plurality of executable software components have assigned tags that match the one or more requirements of the query; and
   when determining that a particular software component of the one or more stored software components has one or more assigned tags that match the one or more requirements of the query, (i) displaying, by the one or more processors, an indication of the particular software component in the graphical user interface, and (ii) adding, by the one or more processors, the particular software component to the software product,
   wherein the computer-implemented method further comprises:
      (i) when determining that the particular software component of the one or more stored software components has the one or more assigned tags that match the one or more requirements of the query, displaying, by the one or more processors, a list or number of products that use the one or more functions performed by the particular software component when executed; or
      (ii) when determining that none of the stored plurality of executable software components have assigned tags that match the one or more requirements of the query, presenting, by the one or more processors, a request for approval to create the desired software component.

2. The computer-implemented method of claim 1, wherein the query is a natural language query.

3. The computer-implemented method of claim 1, wherein receiving the query comprises receiving:
   at least one entity;
   at least one object;
   at least one verb; and
   at least one outcome.

4. The computer-implemented method of claim 1, further comprising:
   determining, by the one or more processors, whether one or more particular stored software components of the stored plurality of executable software components have assigned tags that are partial matches of the one or more requirements of the query; and
   in response to determining that the one or more particular stored software components of the stored plurality of executable software components have assigned tags that are partial matches of the one or more requirements of the query, presenting, by the one or more processors, indications of the one or more particular stored software components in the graphical user interface.

5. The computer-implemented method of claim 1, further comprising:
   when determining that the particular software component of the one or more stored software components has the one or more assigned tags that match the one or more requirements of the query, displaying, by the one or more processors, a rating of the particular software component in the graphical user interface.

6. The computer-implemented method of claim 1, comprising:
   when determining that none of the stored plurality of executable software components have assigned tags that match the one or more requirements of the query, presenting, by the one or more processors, the request for approval to create the desired software component.

7. A computer-implemented method for aiding development of a software product, the computer-implemented method comprising:
   providing, by one or more processors, a graphical user interface;
   receiving, by the one or more processors and through the graphical user interface, a query constructed using the graphical user interface, wherein the query defines one or more requirements of a desired executable software component;
   determining, by the one or more processors, whether one or more stored software components of a plurality of software components perform one or more functions when executed that match the one or more requirements of the query;
   when determining that a particular software component of the one or more stored software components performs the one or more functions when executed that match the one or more requirements of the query:
      a) displaying, by the one or more processors, an indication of the particular software component in the graphical user interface; and
      b) adding, by the one or more processors, the particular software component to the software product; and
   when determining that none of the stored plurality of software components perform the one or more functions when executed that match the one or more requirements of the query, presenting, by the one or more processors, a request for approval to create the desired executable software component.

8. The computer-implemented method of claim 7, further comprising:
   storing by the one or more processors, the plurality of software components; and
   for each software component of the plurality of software components, assigning by the one or more processors, one or more tags to the software component based on the one or more functions performed by the software component when executed.

9. The computer-implemented method of claim 8, wherein the query is a natural language query.

10. The computer-implemented method of claim 8, wherein receiving the query comprises receiving:
   at least one entity;
   at least one object;
   at least one verb; and
   at least one outcome.

11. The computer-implemented method of claim 8, further comprising:
   displaying, by the one or more processors, a rating of the particular software component and the list or the number of products that use the one or more functions performed by the particular software component when executed.

12. One or more non-transitory computer-readable media storing processor-executable instructions that, when executed by one or more processors, cause the one or more processors to perform operations comprising:
   storing a plurality of executable software components;
   for each software component of the plurality of executable software components, assigning one or more tags to the software component based on one or more functions performed by the software component when executed;
   providing a graphical user interface;
   receiving, through the graphical user interface, a query constructed using the graphical user interface, wherein the query defines one or more requirements of a desired software component;
   determining whether one or more stored software components of the stored plurality of executable software components have assigned tags that match the one or more requirements of the query; and
   when determining that a particular software component of the one or more stored software components has one or more assigned tags that match the one or more requirements of the query, (i) displaying an indication of the particular software component in the graphical user interface, and (ii) adding the particular software component to a software product,
   wherein the operations further comprise:
      (i) when determining that the particular software component of the one or more stored software components has the one or more assigned tags that match the one or more requirements of the query, displaying a list or number of products that use the one or more functions performed by the particular software component when executed; or
      (ii) when determining that none of the stored plurality of executable software components have assigned tags that match the one or more requirements of the query, presenting a request for approval to create the desired software component.

13. The one or more non-transitory computer-readable media of claim 12, wherein the query is a natural language query.

14. The one or more non-transitory computer-readable media of claim 12, wherein receiving the query comprises receiving:
   at least one entity;
   at least one object;
   at least one verb; and
   at least one outcome.

15. The one or more non-transitory computer-readable media of claim 12, wherein the operations further comprise:
   displaying the indication of the particular software component along with a rating of the particular software component.

16. The one or more non-transitory computer-readable media of claim 12, wherein the operations comprise:
   when determining that none of the stored plurality of executable software components have assigned tags that match the one or more requirements of the query, presenting the request for approval to create the desired software component.

* * * * *